US009708520B2

(12) United States Patent
Ushijima et al.

(10) Patent No.: US 9,708,520 B2
(45) Date of Patent: Jul. 18, 2017

(54) CONCENTRATED SUGAR ADDITIVE AS ANTI-DUSTING AGENT

(75) Inventors: Helio Haruo Ushijima, Sao Paulo (BR); Ricardo Chagas da Silva, Sao Paulo (BR)

(73) Assignee: CARGILL, INCORPORATED, Wayzata, MN (US)

( * ) Notice: Subject to any disclaimer, the term of this patent is extended or adjusted under 35 U.S.C. 154(b) by 331 days.

(21) Appl. No.: 14/241,292

(22) PCT Filed: Aug. 30, 2012

(86) PCT No.: PCT/BR2012/000325
§ 371 (c)(1),
(2), (4) Date: Jul. 10, 2014

(87) PCT Pub. No.: WO2013/029140
PCT Pub. Date: Mar. 7, 2013

(65) Prior Publication Data
US 2014/0345342 A1 Nov. 27, 2014

(30) Foreign Application Priority Data
Aug. 31, 2011 (BR) .................................... 1104018

(51) Int. Cl.
*B01J 2/30* (2006.01)
*C05F 5/00* (2006.01)
*C05F 11/00* (2006.01)
*E21F 5/06* (2006.01)
*C09K 3/22* (2006.01)
*C05G 3/00* (2006.01)

(52) U.S. Cl.
CPC ....... *C09K 3/22* (2013.01); *B01J 2/30* (2013.01); *C05F 5/008* (2013.01); *C05G 3/0088* (2013.01); *E21F 5/06* (2013.01)

(58) Field of Classification Search
None
See application file for complete search history.

(56) References Cited

U.S. PATENT DOCUMENTS

| 2,853,385 | A | * | 9/1958 | Wiggins | A23K 50/15 426/69 |
| 4,334,095 | A | * | 6/1982 | Baniel | C07C 51/48 562/582 |
| 4,725,234 | A | * | 2/1988 | Ethridge | A61C 17/00 433/215 |
| 4,994,609 | A | * | 2/1991 | Baniel | C07C 51/48 562/580 |
| 5,068,419 | A | * | 11/1991 | Kulprathipanja | C07C 51/47 562/580 |
| 5,231,225 | A | * | 7/1993 | Baniel | C01F 11/18 562/513 |
| 5,237,098 | A | * | 8/1993 | Bemish | C07C 51/47 562/584 |
| 5,426,220 | A | * | 6/1995 | Baniel | C07C 51/48 562/580 |
| 2007/0227211 | A1 | | 10/2007 | McCoy, Jr. | |
| 2008/0161601 | A1 | * | 7/2008 | Baniel | C07C 51/43 562/515 |
| 2010/0233327 | A1 | * | 9/2010 | Hersh | A23L 1/09 426/122 |

FOREIGN PATENT DOCUMENTS

| ES | 2068511 | | 4/1995 |
| WO | 9915480 | | 4/1999 |
| WO | 0008955 | A1 | 2/2000 |
| WO | 2009149334 | A2 | 12/2009 |

OTHER PUBLICATIONS

International Search Report of PCT/BR2012/000325, mailed Dec. 13, 2012, 3 pages.

* cited by examiner

Primary Examiner — Joseph D Anthony

(57) ABSTRACT

The present invention generally concerns a concentrated sugar additive comprising (a) raffinate derived from citric acid recovery industry and (b) sugar-containing solution useful for controlling dust emission from particulate materials during manufacturing, handling, storage or transportation. Such particulate materials comprise fertilizers, minerals, coal, etc.

10 Claims, No Drawings

CONCENTRATED SUGAR ADDITIVE AS ANTI-DUSTING AGENT

CROSS REFERENCE TO RELATED APPLICATIONS

This application is a national phase application of international application PCT/BR2012/000325, filed Aug. 30, 2012, which application claims priority to Brazilian Application PI1104018-1, filed Aug. 31, 2011, which applications are hereby incorporated by reference herein in their entirety.

FIELD OF THE INVENTION

The present invention generally concerns a concentrated sugar additive comprising (a) raffinate derived from citric acid recovery industry and (b) sugar-containing solution useful for controlling dust emission from particulate materials during manufacturing, handling, storage or transportation. Such particulate materials comprise fertilizers or mining products.

BACKGROUND OF THE INVENTION

Dust produced during the manufacturing, handling, transport, storage, crushing, and utilization of fining particulate-producing materials is a common problem for several industries.

Inorganic substances, such as salts of phosphates, nitrates, chlorides, sulfates, etc., are widely used as fertilizers in the agricultural area. Methods of manufacturing or processing these inorganic compounds into particles are also known. Regardless of method or nature of the compound, the resulting particulate materials can easily break into smaller particles (10 micron or smaller), often resulting in an undesirable level of particles fine enough to become airborne dust, particularly when handled, stored or transported.

Fertilizer dust dissemination poses safety, health, environmental, housekeeping and maintenance problems for the producers, distributors and consumers. For instance fertilizer dust has raised health concerns due to human and animal inhalation thereof. It is also a concern when fertilizer dust becomes airborne what can lead to the loss of agronomic and economic value, while potentially contributing to the contamination of surface water ecosystems.

Depending upon the type of substrate, simple remediation like aspiration and water spray may be applied. Otherwise, the vast majority of commercially produced fertilizers are treated with an additive agent to reduce dust formation levels.

Besides the considerable amount of prior art references directly or indirectly related to anti-dust agents in the fertilizer industry, the majority refers to the use of complex synthesis compounds with a binder function, such as some quaternary compounds, or petroleum-based products.

Until this time, treatment of inorganic particulates, such as fertilizers, has focused on petroleum-based products, mineral oils, and waxes. To reduce the dust on fertilizer, a petroleum residue or hydrogenated mineral oil is typically sprayed onto the fertilizer in order to act as an anti-dusting agent. The application of the anti-dusting agent occurs generally during the drying step of the phosphate granules. This facilitates the complete coverage of the coating onto the fertilizer particle surface.

However, there are disadvantages in such treatment methods. With time, oils tend to volatilize and/or soak into the fertilizer and lose their effectiveness, while waxes and petroleum-based products are difficult to handle, and can require special heating equipment. Inorganic particulates coated with petroleum-based products can generate residues on handling equipment, and, in the case of coated fertilizers, typically result in the separation of scum upon dissolution of the fertilizer in water. In addition, such additives do not provide biodegradable coatings.

The application of by-products from organic industries was little investigated to that end. For instance, some by-products derived from the paper making industry, such as lignosulfonate, or glycerin-containing by-products derived from the transesterification industry have already been proposed as dust controlling agents.

In this sense, urea and other fertilizers have been treated with lignosulfonates alone, or in combination with a co-additive, such as molasses. U.S. Pat. No. 5,328,497, filed by Georgia-Pacific Corp (1994) teaches preventing dusting and caking of fertilizer by using an aqueous solution containing lignosulphonate, sugar and urea. However, because aqueous solutions of urea and lignosulfonate have low volatility, they lose their effectiveness long after application.

Other proposed dust control methods for specific fertilizers include application of mixture solutions containing carbohydrates, molasses, gypsum, saccharides, starch, glycerin, polyethylene glycol, triethanolamine and even water. For instance, U.S. Pat. No.7,816,561, filed by Yara International ASA (2008), discloses a method for improving the crushing strength and reducing the dust formation and the caking tendency of urea particles by using carbohydrates. JP56084315, filed by Mitsubishi Chem Ind (published in 1981), teaches a granulated fertilizer consisting of a mixture of gypsum powder and molasses, wherein the gypsum can be used suitably as a land improver, a component of bulk blend fertilizer, etc. JP1270583, filed by Lida Kogyosho KK (1989) refers to a granulated fertilizer formed from fine magnesium silicate powders mixed with an aqueous solution of a binder such as molasses. EP401550, filed by Kali Und Salz AG (1993), teaches the inhibition of dusting in pellets or granules using a solution of molasses and concentrated alkaline earth metal chloride solution. FR2723085, filed by Meac SA (1996), describes a fertilizer product combining a mineral support with anti-dust additives, such as mineral or vegetal oils, molasses, amines and/or water. JP2001158685, filed by Oji Cornstarch KK (2001), teaches a granulated fertilizer consisting of iron and steel slag, and a binder comprising saccharides and a starch powder.

U.S. Pat. No. 3353949, filed by Cyanamid Co. (1967), teaches that a granular fertilizer is treated with a liquid conditioner additive selected form water-soluble sugars, such as glucose, dextrose and black strap molasses, which permits ready occlusion of nutrients. U.S. Pat. No. 5,383,952, filed by Kali & Salz AG (1995), discloses a process for preventing dusting in fertilizer granules during the loading or transporting of granulates, comprising: adding to said granulates a dust-binding, liquid mixture consisting of molasses and another liquid selected from the group consisting of glycerin, polyethylene glycol, triethanolamine and the mixtures thereof. While liquid treatment compositions, such as these, may reduce the fertilizer dust levels, the liquid compositions coated on the fertilizer particles tend to promote caking of the granular fertilizer particles, another inconvenience to be avoided.

For specific organomineral fertilizer manufactured from fire extinguishing powder waste, binding materials derived from distillery industry were also proposed (CZ11701, filed by Jaroslav et al. (2002) and WO06056602, filed by Valoragri SA (2006)).

Numerous attempts to reduce dustiness of inorganic fertilizers, however, through improvements in the fertilizer manufacturing process, have been largely unsuccessful. These methods have a number of disadvantages as well. Aqueous solutions and emulsions tend to accelerate the formation of fertilizer dust and exacerbate the fertilizer particles caking tendencies.

While these conditioning agents provided an improvement in dust control over oils, waxes, and oil/wax blends, they do not provide the degree of binding required for effective long-term dust control. Other liquids also have been used for fertilizer dust control including lignosulfonate solutions, amines, surfactants, waxes, wax emulsions and water alone, but have not proved completely satisfactory.

One prevalent problem is that the use of aqueous treatment solutions tends to exacerbate the caking problem often encountered with inorganic fertilizers. The use of other by-products did not solve the problem completely, as it generally refers to the use of by-products derived from sugar cane or sugar beet industries, such as vinasses or molasses, with uncontrolled amount of sugar, whose content and quality depend on the particular method of extraction, maturity of the sugar cane or sugar beet, the amount of sugar extracted, and the method of extraction or specifically adapted for only one type of fertilizer.

Similarly, dust produced during the handling, transport, storage, crushing, and utilization of coal, petroleum coke, minerals or products from mining industry in general, is not only a nuisance, it is a major health and safety issue. Fires, explosions, and black lung cost the petroleum, mining, utility and steel industries millions of dollars annually due to lost production, medical expenses, lost equipment, and high insurance premiums.

In addition to dust generation, erosion and loss of substrate is another common problem found on surfaces that are prone to particulate generation, particularly those subject to vehicular, pedestrian or other sorts of traffic.

Dust from mining industry is produced and airborne by two major mechanisms: impact or wind erosion.

The impact can produce a substantial amount of airborne particulate matter. Fine particulates also are produced during stacking, crushing, milling, breaking, or reclaiming operations.

One method that has been used to control such dust is by spraying the mining product with water. Water is effective to prevent dusting; however, it evaporates quickly. Therefore, the mining product must be sprayed almost continuously in order to be an effective anti-dusting agent. This continuous spraying is cumbersome and costly, and the droplets of water in the spray often do not even capture the finest, most hazardous particulates. Furthermore, not all mining product can be wetted using water, and, in some uses, moisture level restrictions will be exceeded if too much water is used. Also, an economic penalty may result because it is less efficient to burn high moisture mining product. Surfactants or hydroscopic salts such as magnesium chloride or calcium chloride can be added to the water to improve wettability in some instances; however, the problem of evaporation remains.

Another method used to control dust generation is spraying the area with an oil based composition. Although quite effective at suppressing dust generation for extended periods of time, this method is not environmentally sensitive. In addition to the harm it can impose on the environment, it may pose a significant long term clean-up problem and even potential health hazards. Moreover, the oil treated substrates may adhere to vehicles attempting to travel over the treated substrate, generating unwanted clean-up, excess wear on mechanical equipment, and accelerated breakdown of the treated surface.

The prior art also teaches some compositions consisting of mixture solutions containing molasses, sugars or by-products thereof, but have not proved completely satisfactory. For instance, U.S. Pat. No. 4,582,511, filed by Shell Oil Company (1986), U.S. Pat. Nos. 5,536,429 or 6,790,245, filed by Benetech, Inc. (1996 or 2004), WO 04073928, filed by Archer-Daniels-Midland Company (2004), EP 2228420, filed by Japan Corn Starch Co., LTD. (2010).

Thus, there remains a need in the art for a biodegradable anti-dusting agent which effectively reduces the level of dust emission from inorganic fertilizers or mining industry and that can be used for a large range of inorganic fertilizers, or mining products in general.

DESCRIPTION OF THE INVENTION

In order to overcome the inconveniences related to the dust emission from fertilizers and mining industry, specially related to pollution and toxicological effects, a specific concentrated sugar additive was developed to be used as anti-dusting agent for fertilizers and mining industry in general, which controls powder emission in several stages, for instance manufacturing, handling, storage, transportation, impact, wind erosion, stacking, crushing, milling, breaking, or reclaiming operations.

The additive according to the present invention comprises (a) raffinate and (b) sugar-containing solution.

According to the present invention the raffinate (a) is an aqueous solution effluent (for instance syrup or liquor) from fermentation processes (residuary or not). Raffinate (a) is an aqueous solution comprising at least citric acid, inorganic matter (such as minerals), proteic matter and sugar matter.

Typically, sugar matter includes carbohydrate selected from fructose, dextrose, maltose and/or polyol selected from arabitol, erythritol, or mixtures thereof. The inorganic matter is measured by analyzing ashes and typically includes nitrogen, phosphorus, potassium, calcium, magnesium, sulphur, iron, manganese, copper, zinc, boron, sodium or mixtures thereof.

In a particular embodiment, raffinate (a) may be a by-product derived from the citric acid recovery process, for instance as disclosed in the patent U.S. Pat. No. 4,994,609, assigned to Cargill Inc. (1991), incorporated herein as reference. The raffinate (a) ingredients ratio depends on the performance of the recovery industry. In this case, a by-product without commercial application is used as raw material to the manufacture of a commercial product, also avoiding cost with waste treatment.

The sugar-containing solution (b) may be obtained from several sources, for instance corn, sugar cane, cassava, potato, wheat, rice, etc. In a particular embodiment such a solution may be syrup, i.e. a viscous liquid with a sugar content. Such a component also includes enzymatic or acid conversion syrup, independently from the conversion grade.

Sugar, according to the present invention, is selected from carbohydrates or saccharides in general, including monosaccharides, disaccharides, oligosaccharides, polysaccharides; or mixture thereof. For instance, the solution (b) comprises monosaccharide such as glucose (dextrose), fructose (levulose), galactose, xylose or ribose; disaccharides such as sucrose, maltose or lactose; oligosaccharides such as raffinose or stachyose; polysaccharides such as or starch, amylose, amylopectin, cellulose, chitin; hydrolysates (for instance inverted sugar), derivatives or mixtures thereof.

According to the present invention the sugar-containing solution (b) may be a viscous concentrated solution of sugar, in water or other liquids (for instance alcohols). Such a solution may also include other ingredients such as coloring agents, flavors or thickening agents.

In a particular embodiment component (b) contains about 40% equivalent dextrose in relation to about 80% total solids. For instance, such an ingredient is commercialized as Glucogill 40/82 by the Cargill group in Brazil.

The concentrated sugar additive useful as anti-dust agent comprises:

(a) from about 10 to about 90%, preferably about 40% raffinate from a citric acid recovery process, and (b) from about 90 to about 10%, preferably about 60% glucose syrup.

As a second aspect, the present invention also concerns a process for manufacturing an anti-dusting agent comprising the following steps of:

(i) evaporation of raffinate component (a) up to about 50-65% solids;

(ii) mixing sugar-containing solution (b) until complete homogenization;

(iii) controlling the viscosity by addition of sugar-containing solution (b) if necessary, considering a minimum of about 100 and a maximum of about 100,000 cP (at 25° C.), particularly about 500 to about 10,000, more particularly about 1,600 to about 2,500.

The resulting anti-dusting additive according to the present invention presents the following characteristics:

(a) % Brix (sugar parameter) from about 60 to about 80, particularly about 70-75.

(b) Viscosity: a minimum of about 100 and a maximum of about 100,000 cP (at 25° C.), particularly about 500 to about 10,000, more particularly about 1,600 to about 2,500.

The % Brix is analyzed by a refractometer. The viscosity is measured by cooling the sample at 25° C. and 20 rpm in a Brookfield viscometer DV I.

Due to the characteristics of the additive according to the present invention, especially with respect to controlled concentrations of sugar, as well as physical characteristics (viscosity), it is possible to obtain an improved ingredient able to act as anti-dusting for a broad range of inorganic fertilizers or mining products.

It was found that the application as anti-dusting is not possible with the use of sugars alone (for instance glucose), due to its high viscosity. Contrary to what one would expect, the raffinate (a) is able to control the sugar-containing solution viscosity allowing the anti-dusting application for fertilizers and mining industry, i.e. due the formation of a film with improved anti-dusting properties. Moreover, there is a use of a waste derived from citric acid industry, providing a low-cost and environment friendly anti-dusting product, which also helps the fertilizer function by distributing micronutrients in small and suitable amounts.

The concentrated sugar additive according to the present invention may also comprise other ingredients well known in the art, such as surfactants, biocides, pH adjusters, thickeners, etc.

The inorganic fertilizers treated in accordance with the present invention include, without any limitation, for instance the compounds disclosed in the handbook *The Fertilizer Encyclopedia* (2009) or *Merck Index:* 13th edition (2006), also incorporated herein by reference. Exemplary compounds include phosphates, such as ammonium phosphate, including monoammonium phosphate (MAP) and diammonium phosphate (DAP), and single and triple superphosphates, nitrates, such as ammonium nitrate and potassium nitrate, sulfates, such as ammonium sulfate, and potassium magnesium sulfate, chlorides such as potassium chloride, limestone, dolomite and mixtures thereof.

Mining products include, without any limitation, for instance coal, petroleum coke, minerals or metals.

The present invention also concerns to the use of the additive as described above as anti-dusting agent for mining industry, particularly to avoid powder from impact or wind erosion, or a method for reducing dust emission. This method is particularly useful to avoid dust from impact or wind erosion or during stacking, crushing, milling, breaking, or reclaiming operations.

In addition, the present invention also concerns to the use of the additive as described above as anti-dusting agent for fertilizers or a method for reducing dust emission from fertilizers during manufacturing, transportation or application that comprises applying a dust reducing amount of an additive as described above. In a preferred embodiment of the invention, the dust reducing amount ranges from about 0.01 to 0.5% by weight.

This method is particularly useful for producing a particulate fertilizer having reduced dust emission content compared to particulate fertilizers with additives such as petroleum-based coating agents, oils, by-products such as molasses or vinasses with uncontrolled sugar contend.

Particulate fertilizers are manufactured according to processes well known to those skilled in the art, such as crystallization techniques or recovered naturally in a granular form can be treated to reduce fugitive dust emission in accordance with the method of the present invention.

The following examples are provided for illustration and are not intended as a limitation to the scope of the present invention, other than what is described in the attached claims.

EXAMPLES

Obtaining of Raffinate

A raffinate sample was obtained from the citric acid recovery process disclosed in the patent U.S. Pat. No. 4,994,609, assigned to Cargill Inc. (1991).

Such an ingredient was evaluated in order to identify organic and mineral contents.

One of the tests was carried out to verify the mineral ingredients contained in the raffinate (a).

Therefore, ashes without organic elements (i.e. water, citric acid, raw protein and sugar not converted) were evaluated and the following composition was identified:

TABLE 1

| Raffinate characteristics: inorganic elements (<1.0%) | |
| --- | --- |
| Ingredient | Amount |
| Nitrogen | 0.58% |
| Phosphorus | 0.12% |
| Potassium | 35.0 ppm |
| Calcium | 148.0 ppm |
| Magnesium | 25.0 ppm |
| Sulphur | 0.25 ppm |
| iron | 1.0 ppm |
| manganese | 3.0 ppm |
| copper | 3.0 ppm |
| zinc | 10.0 ppm |
| boron | 110.0 ppm |
| sodium | 900.0 ppm |

TABLE 1-continued

Raffinate characteristics: inorganic elements (<1.0%)

| Ingredient | Amount |
|---|---|
| cobalt | — |
| molybdenum | — |
| aluminum | — |
| chlorine | — |
| nickel | — |
| organic carbon | — |
| organic matter | 19.50% |
| pH | 2.2 |
| density | 1.25 g/mL |
| C/N ratio | 19/1 |
| electric condition | 340.0 µS/cm |

Organic elements detected in the sample include:

TABLE 2

Raffinate characteristics: organic elements

| Ingredient | Amount |
|---|---|
| Citric acid | 5% |
| Fructose | 1% |
| Dextrose | 2% |
| Maltose | 4% |
| Arabitol | 0.6% |
| Erythritol | 2.2% |

The analyzed sample also contains solids (15%) and trace ingredients (<100ppm). C/N ratio=19 and pH=3.

Preparation of the Anti-Dusting Additive

A sample of the anti-dusting additive was prepared by:

(a) evaporation of a raffinate stream according to a process disclosed in the patent U.S. Pat. No. 4,994,609 up to 50% solids;

(b) mixing 6 kg of the raffinate obtained in the step (a) with 4 kg of a glucose syrup, commercialized as Glucogill 40/82, until complete homogenization.

The viscosity and sugar content of the resulting mixture was then analyzed:

(a) % Brix (sugar parameter) from about 60 to about 80, particularly about 70.

(b) Viscosity: about 1,900 cP (250° C.).

The information contained in the foregoing, as well as in the examples, allows a person skilled in the art to perform alternative embodiments not expressly described, but which perform the functions taught herein with the results revealed herein. Such equivalent embodiments are encompassed by the scope of the invention and are therefore covered by the claims presented further on.

The invention claimed is:

1. An anti-dusting additive comprising a mixture of a citric acid containing raffinate and an added sugar-containing solution; wherein the raffinate contains about 50% dry matter by weight and less than 5% citric acid by weight of dry matter and the anti-dusting additive having:
    (a) a % Brix from about 60 to about 80; and
    (b) a minimum viscosity of about 100 cP (at 25° C.).

2. The anti-dusting additive according to claim 1 comprising from about 10 to about 90% raffinate.

3. The anti-dusting additive according to claim 2 comprising about 40% raffinate.

4. The anti-dusting additive according to claim 1; wherein the added sugar-containing solution comprises a monosaccharide, disaccharide, oligosaccharide, polysaccharide, or mixture thereof.

5. The anti-dusting additive according to claim 4; wherein the sugar-containing solution comprises glucose syrup.

6. The anti-dusting additive according to claim 5 comprising from about 10 to about 90% sugar-containing solution.

7. The anti-dusting additive according to claim 6 comprising about 60% sugar-containing solution.

8. A process for manufacturing an anti-dusting additive of claim 1 comprising the steps of:
    (a) evaporation of a citric acid containing raffinate to about 50% dry solids by weight;
    (b) mixing a sugar with the product of step (a) until complete homogenization;
    (c) controlling the viscosity of the product of step (b) by addition of a glucose syrup until a viscosity of between 100 to 100,000 cP (at 25° C.) is acheived.

9. A method of reducing the dust in the manufacture, transportation, or application of fertilizers comprising spraying a dust reducing amount of the product of claim 1 onto the fertilizer.

10. A fertilizer comprising an anti-dusting additive according to claim 1.

* * * * *